Jan. 13, 1931. P. VIVIANO 1,788,696
WEIGHING SCALE
Filed Aug. 15, 1929 3 Sheets-Sheet 3
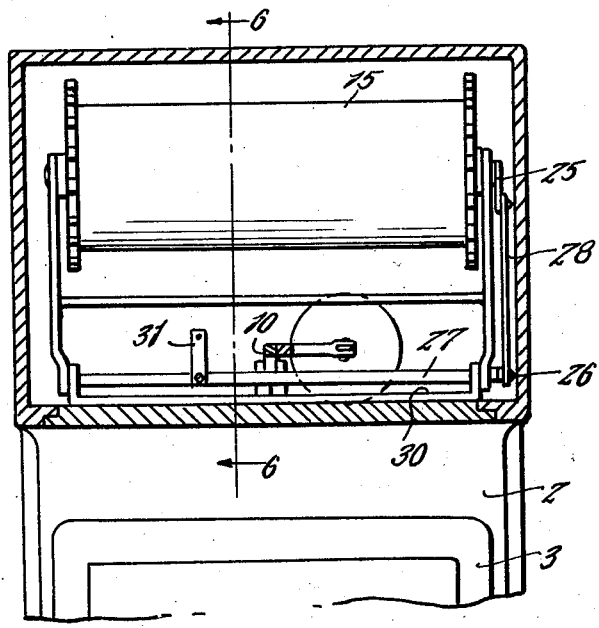
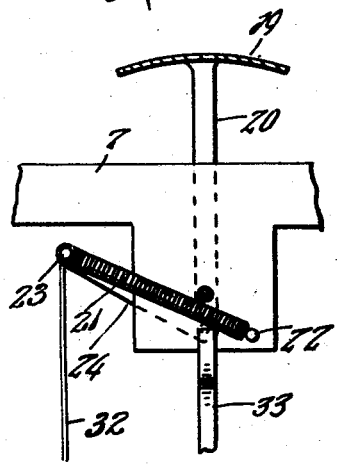
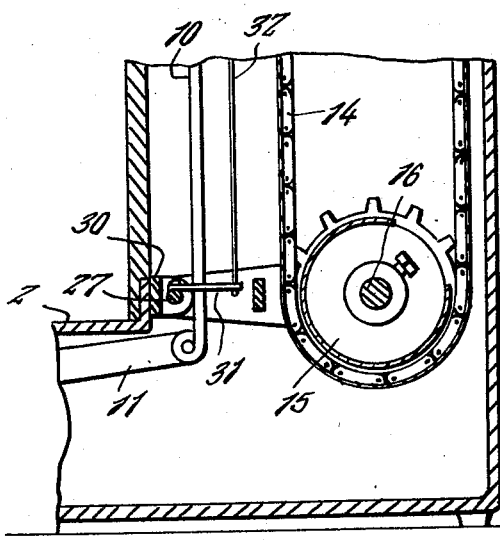
Inventor
Phillip Viviano
By Clarence A. O'Brien
Attorney Patented Jan. 13, 1931

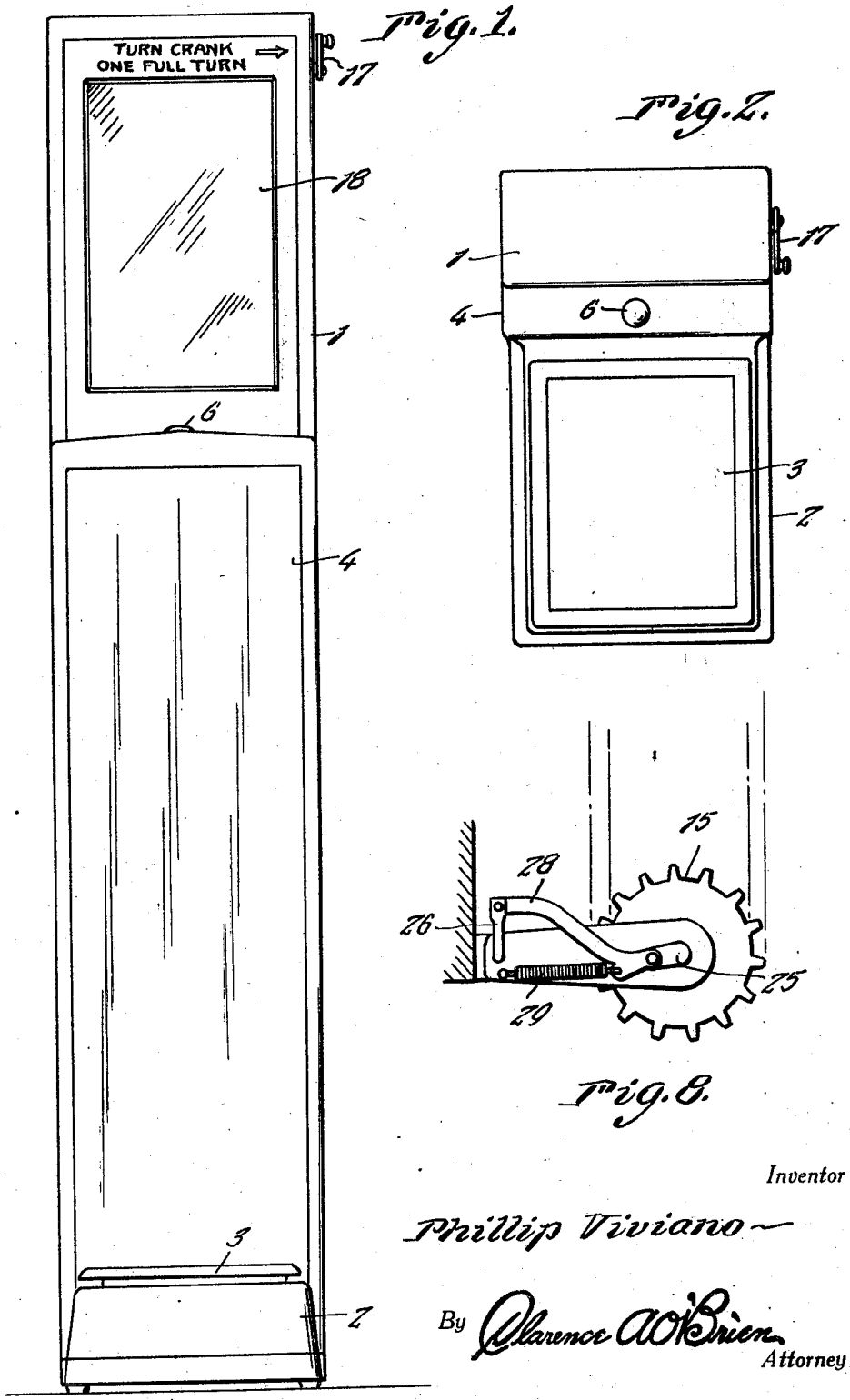

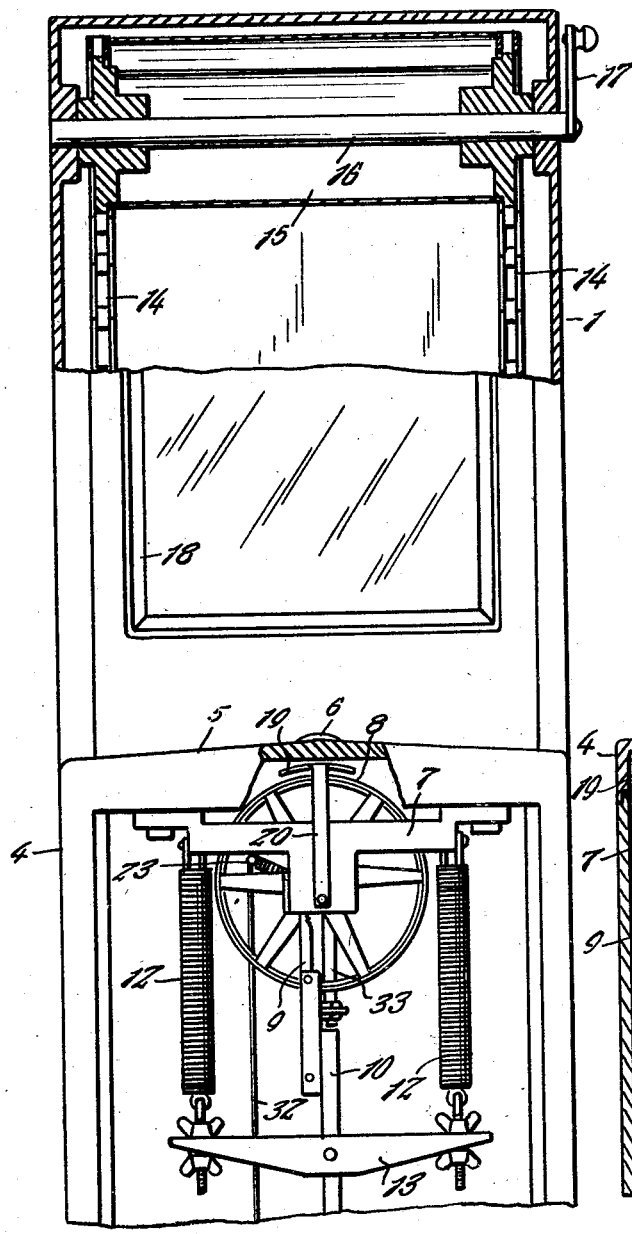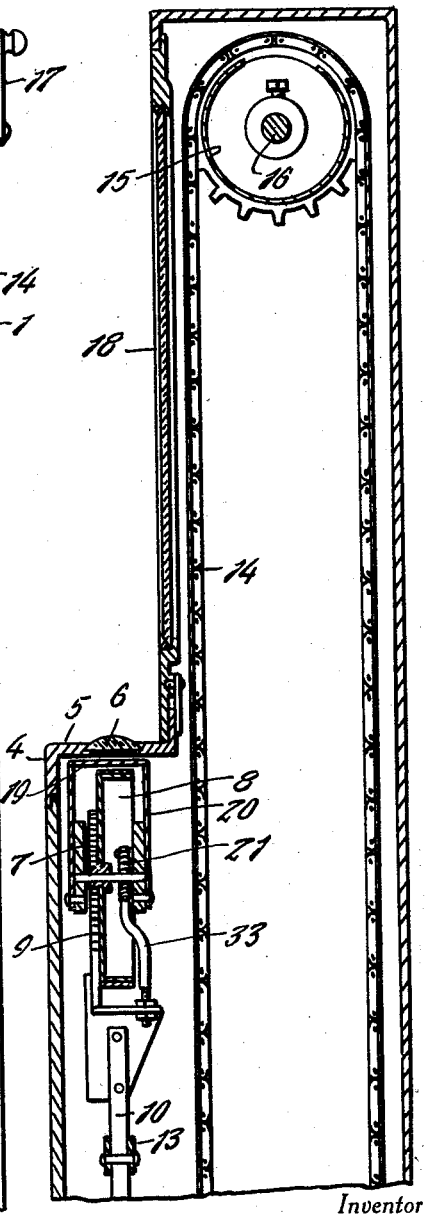

1,788,696

UNITED STATES PATENT OFFICE

PHILLIP VIVIANO, OF ST. LOUIS, MISSOURI

WEIGHING SCALE

Application filed August 15, 1929. Serial No. 385,990.

This invention has reference to an improved weighing scale and more particularly to a weighing apparatus having display advertising means combined therewith in a novel and attractive manner.

One of the essential objects of the invention is to provide a weighing apparatus having means for presenting to the public view a varied and changeable assortment of advertising displays and effecting a change of displays coincident with each weighing operation.

A further object of the invention is to provide a weighing apparatus in which the weight designating indicia is normally concealed from the person weighed and is revealed only upon manual operation of a changeable advertising exhibitor mechanism whereby the exhibited advertising matter is exposed in an attractive and noticeable manner.

Further objects and advantages of the invention will be apparent from the following description thereof, considered in connection with the accompanying drawings wherein:

Figure 1 is a view in front elevation of the improved weighing scales,

Figure 2 is a top view thereof,

Figure 3 is an enlarged detail view of the scale in front elevation, the casing being partly in section to disclose the inner mechanism, Figure 4 is an enlarged transverse sectional view of the scales, Figure 5 is a detail sectional view of the scale base, Figure 6 is a sectional view along line 6—6 of Figure 5, Figure 7 is a detail view of the shutter and shutter tensioning means, and Figure 8 is a detail view of the shutter operating mechanism.

The invention is applicable to various types of weighing apparatus and in the following disclosure will be described with reference to its use on a platform scale of the type shown in the drawing.

Briefly described, the scale embodies an upright casing 1 extending vertically from adjacent one end of the horizontal base 2 in which is suitably mounted the scale platform 3. The upright casing 1 has a forwardly disposed offset portion 4 providing a ledge or shoulder 5 in the center of which is a sight opening having a magnifying glass, as indicated at 6 in Figures 2 and 4.

Suitably supported below the sight opening in a bracket 7 is a rotatable element 8 on the periphery of which are arranged weight-designating numerals adapted to be respectively moved into registration with the sight opening as the element is rotated. The element 8 is geared, by a rack and pinion connection 9, to a long rod 10 having its lower end pivotally connected to a lever 11 forming part of the mechanism (not shown) which supports the platform 3.

The movement of the parts is so regulated that when the scale platform 3 is depressed by the weight of the person standing thereon, the rod 10 is likewise moved downwardly, causing the element 8 to be rotated sufficiently to place the proper weight indicating numerals in registration with the sight opening 6.

In the absence of any weight on the platform scale, the parts are retained in zero position by an adjustable tensioning mechanism including the springs 12 connected with the rod 10 by the bracket 13, as clearly shown in Figure 3.

The tensioning mechanism serves also to reset the parts after each weighing operation. Combined with the weighing apparatus is an advertising display-mechanism including a pair of spaced parallel endless chains 14 disposed longitudinally of the upright casing 1 and supported at their opposite ends by toothed drums 15, the latter being fixed on rotatable shafts 16, the upper one of which is provided with a crank handle 17 for turning the same.

These chains provide supports for an advertising strip, not shown, presenting a series of advertising panels each of which is adapted to be successively displayed through a glass window 18 provided in the front face of the casing above the sight opening, as shown in Figures 3 and 4.

The crank is adapted to be given one full turn at each operation as indicated by the legend on the front of the casing and at each operation the visible display panel is replaced by the successive panel.

For the purposes of the present invention a shutter mechanism is provided for normally concealing the designated weight from the view of the person standing on the scale platform until the advertising display means is manually operated to effect a change of advertising panels at the window 18. This mechanism comprises a shutter 19 extending crosswise of the periphery of the weight designating element 8 and having depending legs 20 pivoted at their lower extremities to the sides of the bracket 7; the legs of the shutter being of such length as to position the shutter for movement in an arcuate path between the sight opening 6 and the peripheral portion of the weight designating element 8.

At its normal position, the shutter is positioned directly below the sight opening, effectively concealing from view the weight designating numerals registering with the opening, and it is retained in this position by shutter-tensioning means such as illustrated in Figure 7.

As therein shown, the shutter tensioning means embodies a tensioning spring 21 anchored at its end 22 to the bracket 7 and attached at its end 23 to an arm 24, the latter consisting of an angular extension of one of the shutter legs 20.

It will be observed that the shutter arm 24 is at such an angle with respect to the legs 20 that the end 23 of the spring is, in the normal position of the shutter, disposed above the pivot of the latter. Hence, the spring 21 is tensioned above the pivot of the shutter and the shutter is held by the tension of the spring against the pull of wire 32.

The operating means for the shutter comprises a crank 25 fixed to one end of the lower drum shaft 16 and pivotally coupled to the crank 26 of crank shaft 27 by means of an angular link 28, as shown in Figure 8; the links being spring tensioned as shown at 29 and of such angularity as to cause the crank shaft 27 to be rocked rather than rotated about an axis during the rotation of the lower drum shaft 16.

The shaft 27 extends transversely of the lower portion of the casing 1, being supported above the lever 11 by a bracket 30. Fixed to the shaft 27 is a horizontally projecting finger 31 to which is secured one end of a wire or other flexible element 32 which has its other end attached to the shutter arm 24 as seen in Figure 3. Thus, when the crank 17 is rotated its full turn, causing a corresponding rotation of the upper and lower drum shafts 16, the crank 25 of the lower drum shaft by reason of its operative connection with the crank shaft 27 will rock the latter on its axis and move the finger 31 downwardly exerting a pull on the arm 24 of the shutter through the medium of the element 32, whereby the shutter is swung to the left of the pivot in Figure 3, and, hence, moved out of alinement with the sight opening 6.

It is retained in this position by reason of the end 23 of the shutter arm having been moved to a point below the pivot of the shutter whereby the spring 21 being thus tensioned below the pivot of the shutter tends to hold the shutter in its open position, as will be readily understood.

The flexibility of the element 32 permits the finger 31 to return to its raised position without actuating the shutter 19, said element 32 simply flexing during this upward movement of the finger. It will also be apparent that the finger 31 may continue to oscillate, being actuated by the exhibiting mechanism, without operating the shutter after said shutter is swung to inoperative position by the first downward movement of the finger.

In order that the shutter will be automatically returned to its normal position as soon as the weight is removed from the scale platform 3, the rod 10 is equipped at its upper end with an adjustably mounted trip element 33 projecting upwardly for engagement with the spring 21 inwardly of the secured end of the latter, as shown in Figure 7.

The trip 33 falls and rises with the rod 10 and in its upward movement with the rod, after the platform has been vacated, contacts with the spring 21, the latter having previously been moved into a more or less horizontal position by the opening movement of the shutter. The upward pressure of the trip moves the spring upwardly so as to initially shift the end 23 of the shutter arm above the shutter pivot, subsequent to which the full tension of the spring is exerted above the pivot of the shutter to reset the shutter in its proper normal position where it is held by the tension of the spring against the pull of wire 32.

From the foregoing it will be seen that when the platform of the scale is occupied by a person desirous of ascertaining his weight, the weight designating indicia will not be exposed in the sight opening until the person has rotated the crank handle of the display advertising mechanism a full turn, in the course of which operation an advertising panel is exposed through the window of the scale coincident with the exposure of the weight designating indicia.

The moving parts of the device are automatically reset, as above described after each weighing operation and, it is obvious that all of the advertising panels will be successively displayed at the window during a continued period of use of the machine.

It will be further understood that the invention is susceptible of various modifications and changes in the structure as herein presented and all such changes may be made within the scope of the appended claims without departing from the spirit of the invention.

Having thus described my invention, what I claim as new is:

1. In a weighing apparatus, in combination, a casing having a sight opening, a weighing mechanism therein including a rotatable element having weight designating numerals on the periphery thereof adapted to be respectively brought into registration with the sight opening, a changeable advertising exhibiting mechanism within the said casing, a pivoted shutter normally disposed between the said sight opening and the weight designating elements so as to prevent a reading of the latter, shutter operating means for moving the shutter to one side of the sight opening to permit reading of the weight designating means, said shutter operating means including a rock shaft, a flexible connection between the rock shaft and the shutter, a driving connection between the said rock shaft and the exhibiting means, means for holding the shutter in its position on one side of the sight opening during continued operation of the exhibiting means and means for resetting the shutter after each weighing operation.

2. In a weighing apparatus, in combination, a casing having a sight opening, a weighing mechanism including a rotatably mounted element having weight designating numerals on the periphery thereof adapted to be brought into registration with the said sight opening, a pivoted shutter normally disposed between the sight opening and the periphery of the said element to prevent a reading of the latter, and shutter actuating means including a rock shaft, a flexible connection between the said rock shaft and the shutter, a manually operable advertising device, an operating connection between the said device and the rock shaft, a spring connected to the shutter and in the normal position of the shutter being tensioned above the pivot of the shutter for holding the same against the pull of the flexible connection and in the open position of the shutter being tensioned below the pivot for holding the shutter open independently of the continued operation of the advertising device, and means for moving said spring into shutter closing position at the completion of each weighing operation.

3. In a weighing apparatus, in combination, a casing having a sight opening, a weighing mechanism including a rotatable element positioned below the sight opening and having weight designating numerals on the periphery and an actuating bar geared to said rotatable element for turning the same, shutter mechanism interposed between the said sight opening and the periphery of the said rotatable element to normally prevent the reading of the latter, said shutter having an angular extension, display advertising means in the said casing and being operatively connected with said shutter for moving the latter laterally of the said sight opening to permit a reading of the weight designating numerals at each operation of the said advertising display means, a tensioning element engaged with said angular extension of the shutter and serving to normally position the latter in registration with the said sight opening, said tensioning element also serving to retain the said shutter laterally of the sight opening when it occupies such a position, and trip means connected with the said weighing mechanism to engage and move the said tensioning element into shutter closing position at the completion of each weighing operation.

In testimony whereof I affix my signature.

PHILLIP VIVIANO.